United States Patent Office 3,796,673
Patented Mar. 12, 1974

3,796,673
METHOD OF PRODUCING MULTICOMPONENT METAL-METAL OXIDE SINGLE CRYSTALS
Grady W. Clark, Oak Ridge, James C. Wilson, Kingston, and Bennie F. Oliver, Knoxville, Tenn., and Alan T. Chapman, Jr., Atlanta, Ga., assignors to the United States of America as represented by the United States Atomic Energy Commission
Filed June 30, 1972, Ser. No. 267,770
Int. Cl. H01b 1/02
U.S. Cl. 252—515
5 Claims

ABSTRACT OF THE DISCLOSURE

A method is disclosed for the directional solidification of a binary composition from a ternary melt.

BACKGROUND OF THE INVENTION

This invention was made in the course of, or under, a contract with the United States Atomic Energy Commission. It relates generally to a method for growing binary component crystals.

Crystals of refractory oxides having insulator properties and containing longitudinally dispersed fibers or lamellae of a metal conductor have been found useful as field emission devices. In general, the overall crystal 1 is comprised of a matrix 2 of a refractory dielectric oxide surrounding a plurality of rod-like or lamellae crystals 3 of a conducting metal. The conducting rods are small having a diameter from about 0.1 to 2 microns and a distribution of about $10^5$ to $10^7$ rods per square centimeter of cross section. Because of the geometry of the overall crystal 1 and the smallness of the metallic rods 3, the crystal 1 has optimum field emission characteristics.

In the past, crystals of the above type have been grown by directionally solidifying a binary eutectic composition of the refractory oxide and the metal. Preferably these crystals have been grown by a molten zone technique in an R.F. field. Examples of the systems grown by this technique include $ZrO_2(Ca)$—W, MgO—W, MgO—Mo, MgO—Re, $Cr_2O_3$—W, $HfO_2(Y_2O_3)$—W, and $UO_2$—Ta. By referring to the phase diagrams of the above systems it is seen that extremely high temperatures are required to form a melt from these systems. At these temperatures, generally in excess of 2000° C., process control and reproducibility are difficult with existing equipment. Any lowering of the processing temperature at all greatly simplifies control of the process. The power requirements for maintaining this temperature also make the cost of the crystals prohibitive for many applications. In the case of $UO_2$—W, for example, a power level of 6 kw. is required for 3-7 hours to produce a single sample of 0.6 in. diameter by 1.5 in. long.

SUMMARY OF THE INVENTION

It is thus an object of this invention to provide a process for producing a crystal of a binary composition which does not require heating above the binary eutectic temperature.

It is a further object of this invention to provide a process for producing crystals which requires a lower power input than was required in the process of the prior art.

These and other objects are accomplished by a process wherein a third component which lowers the solidus temperature of two binary components and which has no appreciable solid solution with either of the two binary components is used as a liquid solute in a molten zone solidification process. The third component solute remains in the molten zone and only the binary composition is precipitated.

DETAILED DESCRIPTION

According to this invention, it has been found that a binary crystal can be grown by a molten zone technique wherein the molten zone contains a third component solute which does not precipitate into the solid phase during directional solidification.

The primary requirements for carrying out the process of this invention are that the solute reacts to lower the solidus temperature of the binary composition and exhibits no appreciable solid solution with the binary components. Preferably the third component solute exhibits a eutectic with each of the binary components to suppress the binary solidus. The binary components must, of course, have a eutectic. The eutectic composition of the binary components is the composition which is solidified to grow the dual component crystals according to this invention. As used within this disclosure the term "no appreciable solid solution" means a total solid solution of less than about 5 mole percent.

To further explain the invention, a description will now be given with particular reference to the eutectic solidification of $UO_2$ and W using MgO as a third component solute.

The crystals contain $UO_2$ and W in proportions substantially near the eutectic composition and are grown at about 2400° C. rather than at the binary eutectic temperature of 2640° C. The addition of MgO to the $UO_2$—W system brings about a eutectic with both $UO_2$ and W. The MgO has a reasonable liquid solubility of tungsten but the solubility of MgO is very limited in the precipitated $UO_2$ and W crystals.

Figure 2:
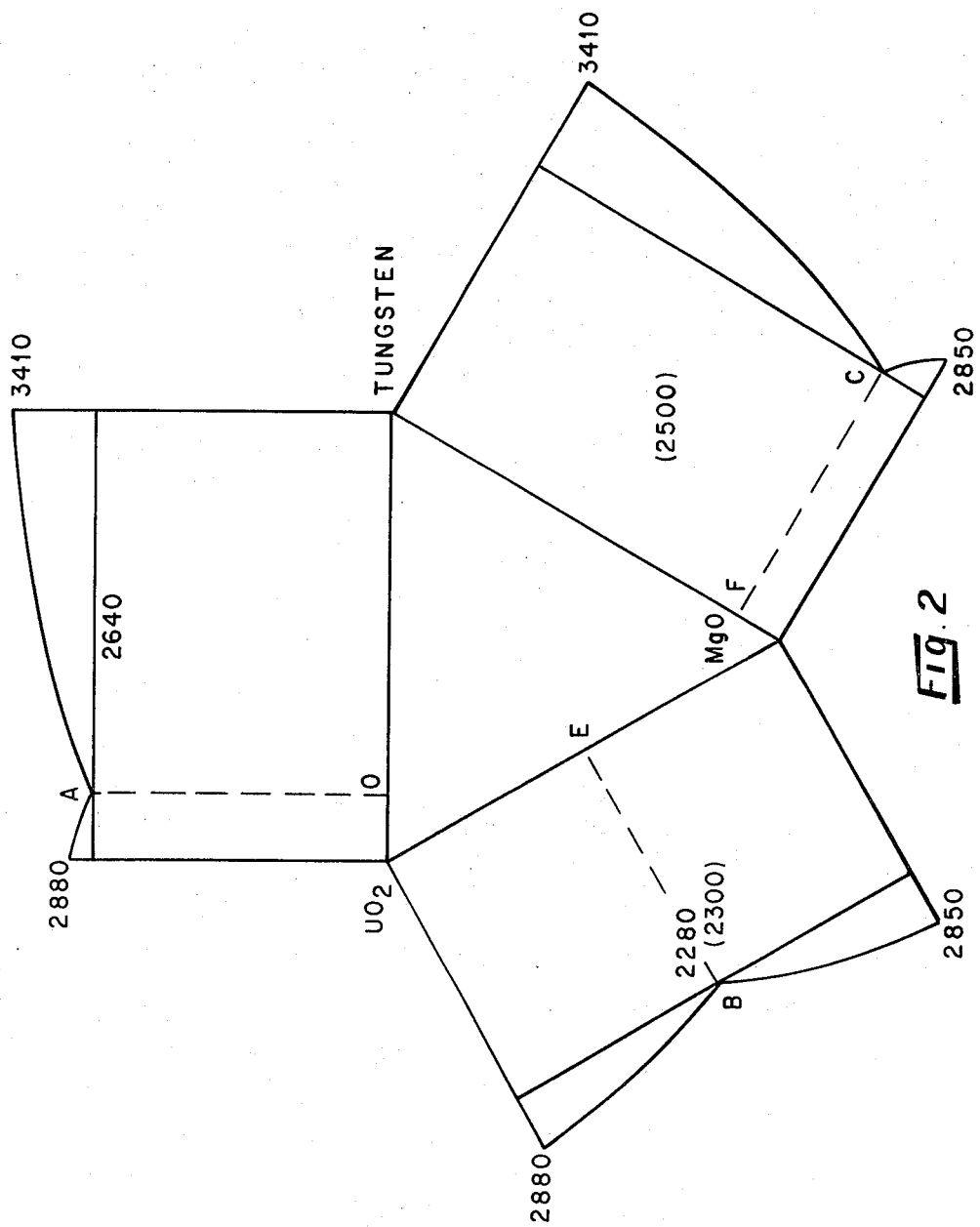
FIG. 2 shows phase diagrams of $UO_2$—W, W—MgO and MgO—$UO_2$ arranged to produce a central triangle.
Figure 3:
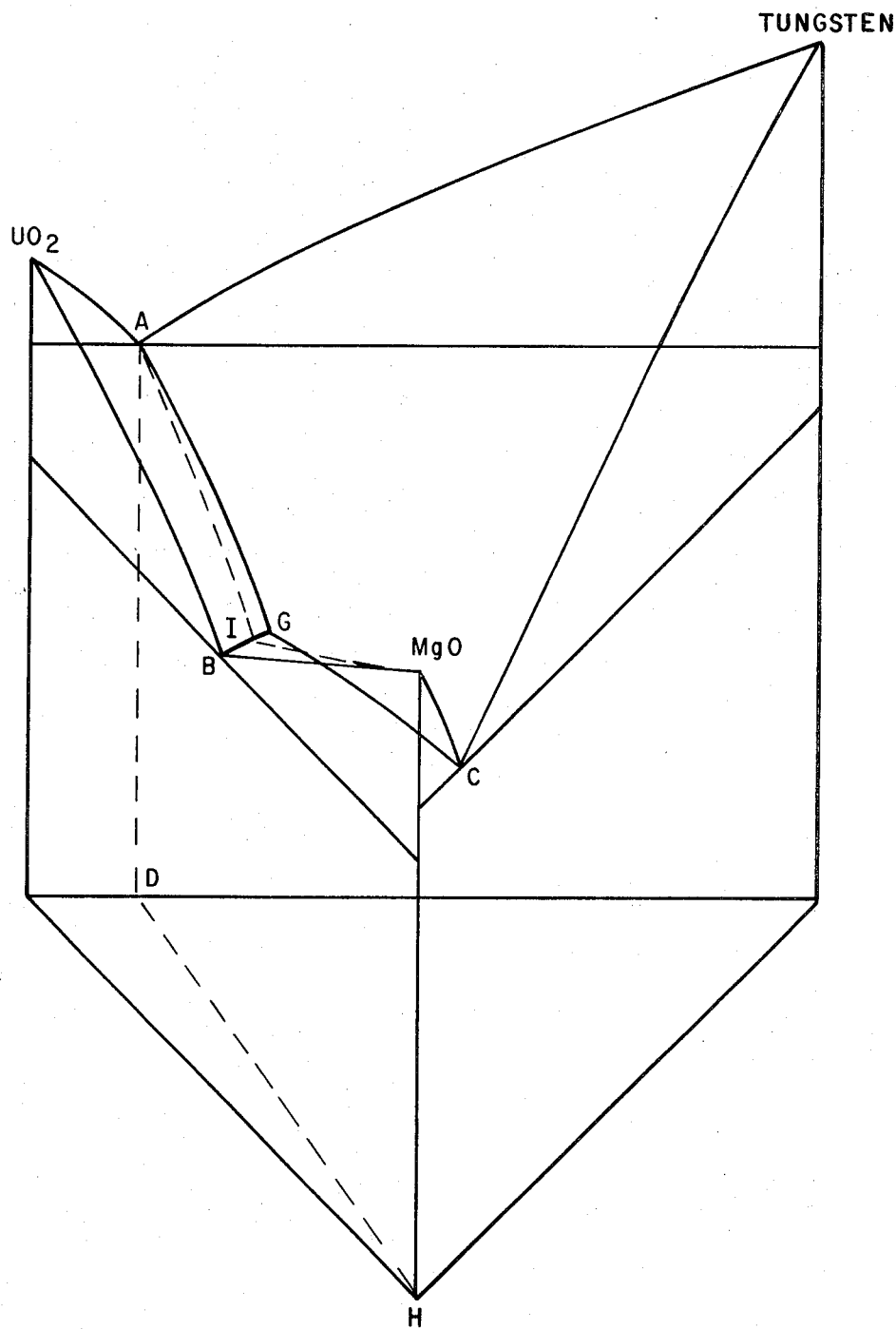
FIG. 3 is an isometric view of the three dimensional phase diagram produced by the triangle of FIG. 2.
Figure 4:
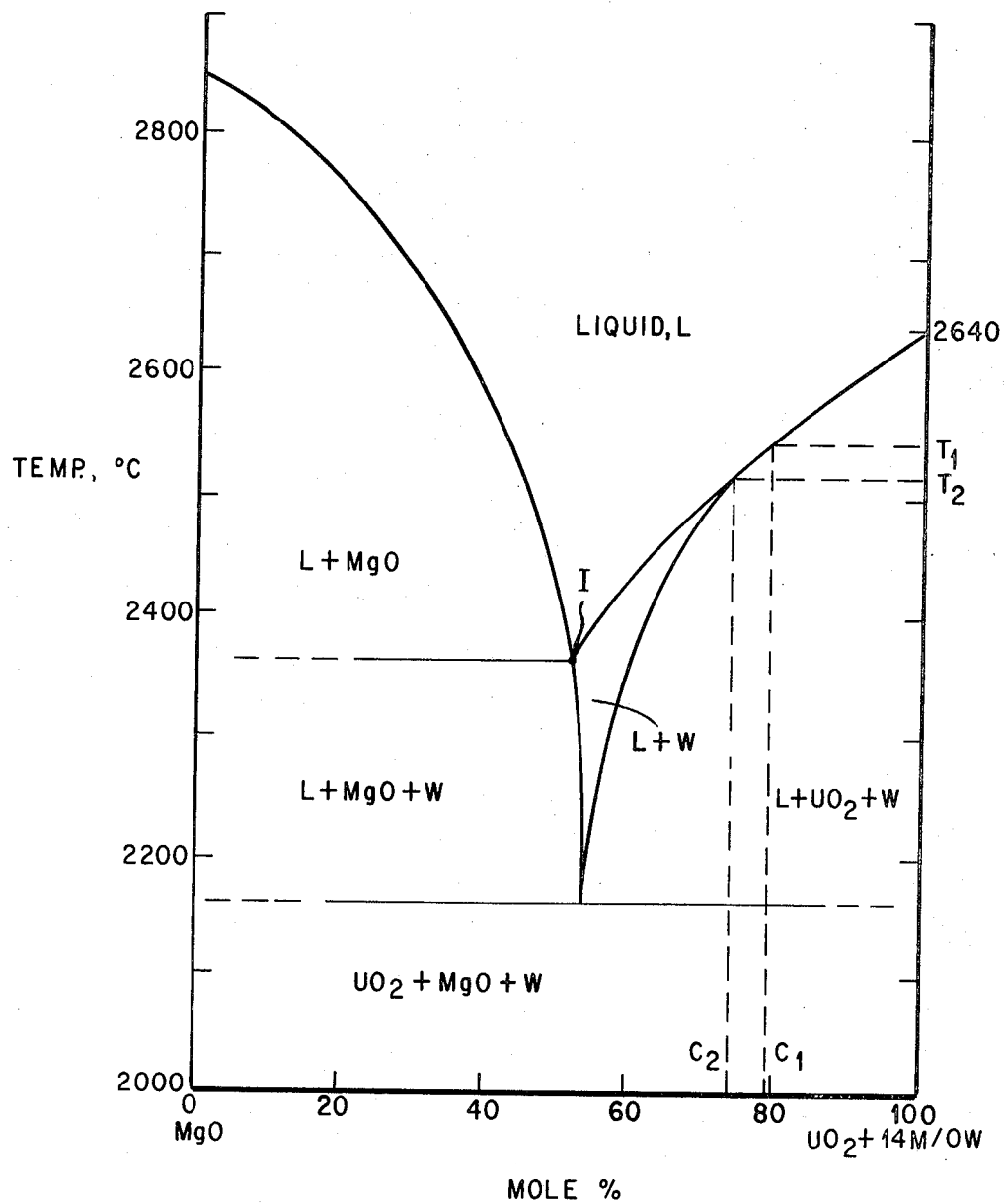
FIG. 4 is a sectional view of the plane ADH of FIG. 3.

The principle of the subject development may be understood by referring to FIGS. 2-6. In FIG. 2 is shown the general binary systems $UO_2$—W, W—MgO and $UO_2$—MgO. These binary systems are known with some certainty in the prior art. In the $UO_2$—W system, a eutectic (point A), having a melting point at 2640° C., occurs at about 14 mole percent (m/o) tungsten (point D). Hereinafter, this eutectic will be designated as $UO_2$-14 W. A eutectic (point C) in the W—MgO system, at about 10 m/o (point F) tungsten, melts at about 2500° C. A eutectic (point B) occurs at or near 50–50 m/o (point E) in the $UO_2$—MgO binary system that melts at about 2300° C. When all these components are combined, a three-component phase diagram can be used to explain the system and this is shown in FIG. 3. The entire system exhibits a eutectic at point G. The exact composition of this eutectic is not known at this time.

If in the $UO_2$—W—MgO system the ratio of $UO_2$ composition to W composition is maintained constant while varying the concentration of MgO, the resulting compositions would lie along a plane such as that including points A, D, H and I of FIG. 3. If just this plane is analyzed, a type of pseudo-binary system could be shown as in FIG. 4. It may be seen from FIG. 4 that heating a pellet of MgO to some temperature $T_1$ while surrounded with a mixture of $UO_2$—W will cause a liquid solution of MgO and $UO_2$—W to form at the interface between the pellet and the mixture. As the solution proceeds, the composition may be followed from the left to the right of FIG. 4 at temperature $T_1$. When reaching a concentration $C_1$, a slight lowering of the temperature to $T_2$ will cause $UO_2$–14 W to precipitate causing the concentration to move back the left to a concentration $C_2$ which will precipitate $UO_2$–14 W at $T_2$. This is the desired composition of the molten zone that may be migrated through a solid rod. The amount of third component solute is chosen such that the composition of the melt in the molten zone will lie slightly to the right of composition $C_2$ of FIG. 4. This permits only $UO_2$ and W to precipitate. However, it is preferable to stay as close to composition $C_2$ as possible since moving closer to composition $C_1$ will necessitate an increase in the temperature used for carrying out the process. The volume of the molten zone will, of course, vary with the type of equipment used and thus the amount of third component solute must be calculated so that a composition near $C_2$ will ultimately result when the molten zone is established.

Figure 1:
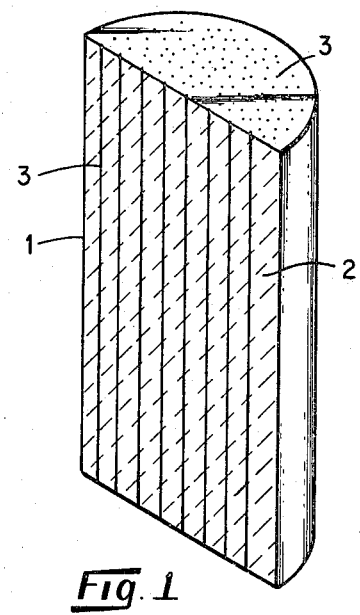
FIG. 1 is a sectional view of a dual component crystal produced according to this invention.
Figure 5:
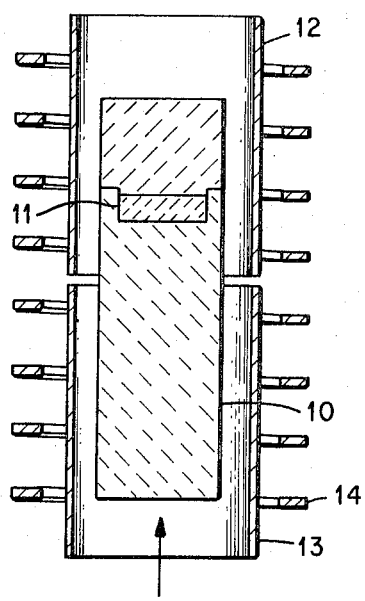
FIG. 5 is a sectional view of the apparatus and sample used in beginning the process of this invention.
Figure 6:
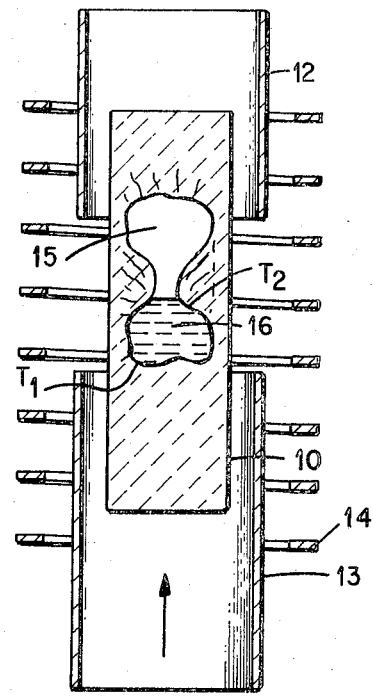
FIG. 6 is a sectional view of the apparatus and sample used as an intermediate stage of the process of this invention.

This mechanism of crystal growth may be further explained by reference to FIGS. 5 and 6. Shown schematically therein is apparatus used for the method. A cylindrical bar 10 of pressed $UO_2$–14 W powder, having a pellet 11 of MgO therein, is mounted in a conventional manner for axial and rotational movement within a molybdenum susceptor tube having an upper portion 12 and a lower portion 13. Surrounding tubes 12 and 13 is a R.F. coil 14 driven by a power supply (not shown).

The composite bar is preheated and sintered by inductively heating the susceptor tubes. When the bar temperature reaches about 1200–1500° C., the upper susceptor tube 12 is raised thereby permitting R.F. coupling of the bar 10 by coil 14. The R.F. power is raised slowly, to prevent cracking, until the center of bar 10 reaches about 2500° C. This requires about 20 minutes. The outer surface of the bar at this point is about 1850° C. The MgO reacts with and dissolves in the $UO_2$–14 W at this temperature to produce a central molten zone.

After a steady state is reached, nominally after about 5 minutes, the bar is moved up through the R.F. field and is continuously rotated. As the bar moves upward, the upper portion of the melted zone cools to the temperature $T_2$ of FIG. 3 whereby the $UO_2$–14 W solidifies from the top surface of the molten zone to produce the desired crystal. This is illustrated in FIG. 6. If the solidification rate is slow, the energetics of the system favor the deposition of $UO_2$ on $UO_2$ and W on W. Thus, filaments or lamellae of tungsten are produced within a urania matrix. Because of the rotation, the upper surface of the molten zone is substantially flat and perpendicular to the bar axis. As a result, the tungsten filaments grow in a substantially axial direction. In general, the molten zone precipitates $UO_2$ and W behind it as it moves through the bar. The $UO_2$ and W lost by precipitation are replenished when the molten zone moves forward and dissolves additional $UO_2$ and W. The composition of the molten zone thus remains substantially constant. The following example further describes the growing technique.

EXAMPLE

A pressed rod of $UO_2$–14 W was prepared having a diameter of 0.9 in. and a length of 2.5 in. Near one end thereof was a pellet of MgO 0.3 in. in diameter and 0.3 in. thick. The composite bar was placed within the susceptor and preheated and sintered at about 1500° C. in atmosphere of 9 parts by volume $N_2$ and 1 part $H_2$. The upper susceptor tube was then raised so that the R.F. power coupled to the bar and heating continued to a surface temperature of about 1850° C. At that time rotation at about 150 r.p.m. was begun while the rod was moved up through the R.F. field at about 12 mm./hr. This was continued for 3 hours at which time the molten zone had traveled substantially the length of the rod. The R.F. power of about 5 kw. during the crystal growth was then reduced to bring about solidification of the molen zone and then the temperature was reduced to room temperature slowly. In general, the process requires about 70% of the power used by the prior art technique.

A crystal grown by this method had a substantially pure $UO_2$ matrix with tungsten filaments of about 0.5 micron (diameter) spaced about 8 microns apart. These filaments or lamellae were epitaxially bonded to $UO_2$ usually with preferred crystalline morphologies.

As applied to the tungsten-urania system the oxides of CaO, $Y_2O_3$, $Cr_2O_3$, $ZrO_2$, SrO, BaO, $HfO_2$ and BeO have similar properties to MgO and may be considered equivalents thereof. Also, the subject invention is useful for growing crystals having filaments or lamellae of W in oxides such as $UO_2$, $ThO_2$, $ZrO_2$, and MgO or W, Re and Mo in $Cr_2O_3$. The above-mentioned equivalents of MgO may be used in accordance with this invention in the growth of the above binary systems. However, $HfO_2$ and $ZrO_2$ give results slightly inferior to the other oxides.

What is claimed is:

1. A method of growing a two component crystal, said crystal comprising lamellae of one of said components surrounded by a matrix of a single crystal of the other component, comprising the steps of:
    forming a polycrystalline rod of a eutectic mixture of said components, said rod having a pocket therein containing a third component, said third component forming a eutectic with each of said two components;
    establishing a molten zone around said pocket, the melt of said zone consisting essentially of said two components and said third component; and
    moving said zone longitudinally through said rod, said zone leaving said two component crystal behind it as it moves and retaining essentially all of said third component.

2. The method according to claim 1 wherein said two components are selected from the group consisting of $UO_2$—W, $ThO_2$—W, $ZrO_2$—W, MgO—W, $Cr_2O_3$—W, $Cr_2O_3$—Re and $Cr_2O_3$—Mo.

3. The method according to claim 2 wherein said third component is selected from the group consisting of MgO, $Y_2O_3$, $Cr_2O_3$, $ZrO_2$, SrO, BaO, $HfO_2$ and BeO.

4. A method according to claim 3 wherein said binary components are uranium dioxide and tungsten and said third component is MgO.

5. The method according to claim 1 wherein said step of establishing comprises using an R.F. field to heat said rod.

References Cited
UNITED STATES PATENTS
3,663,180   5/1972   Brissot  _____ 23—301 SP JOHN D. WELSH, Primary Examiner U.S. Cl. X.R.
252—518, 512; 23—301 SP, 304